United States Patent [19]

Sargent

[11] Patent Number: 4,459,868

[45] Date of Patent: Jul. 17, 1984

[54] MECHANICAL POWER CONVERSION AND TRANSMISSION SYSTEMS

[76] Inventor: Frank R. Sargent, 41 B St., Laurel, Md. 20707

[21] Appl. No.: 283,215

[22] Filed: Jul. 14, 1981

Related U.S. Application Data

[63] Continuation-in-part of Ser. No. 097,979, Nov. 28, 1979.

[51] Int. Cl.³ .................... F16H 15/16; F16H 13/00
[52] U.S. Cl. .......................................... 74/191; 74/208
[58] Field of Search ......................... 74/193, 191, 208

[56] References Cited

U.S. PATENT DOCUMENTS

| | | | |
|---|---|---|---|
| 414,191 | 11/1889 | Conant | 74/190.5 |
| 1,379,511 | 5/1921 | Ballard | 74/191 |
| 1,443,991 | 2/1923 | Hayden | 74/191 |
| 2,715,164 | 8/1955 | Hufnagel | 74/191 |
| 2,749,491 | 6/1956 | Stinger | 74/191 |
| 2,776,591 | 1/1957 | McBride | 74/191 |
| 3,222,944 | 12/1965 | Harned | 74/208 |
| 3,280,646 | 10/1966 | LeMieux | 74/200 |
| 4,192,200 | 3/1980 | McCoin | 74/191 |
| 4,192,201 | 3/1980 | McCoin | 74/191 |
| 4,322,798 | 3/1982 | McCoin | 74/191 |

FOREIGN PATENT DOCUMENTS 7930227  6/1979  European Pat. Off. ............. 74/208

*Primary Examiner*—Lawrence J. Staab
*Assistant Examiner*—Michael D. Bednarek
*Attorney, Agent, or Firm*—Frank R. Sargent

[57] ABSTRACT

A continuously variable transmission in which power is transfered from an input shaft through gearing to an idler cone, and from the idler cone through gearing to an output shaft. The transmission ratio is a function of the ratio of output power required to the input torque as determined by a torque sensing means.

3 Claims, 4 Drawing Figures

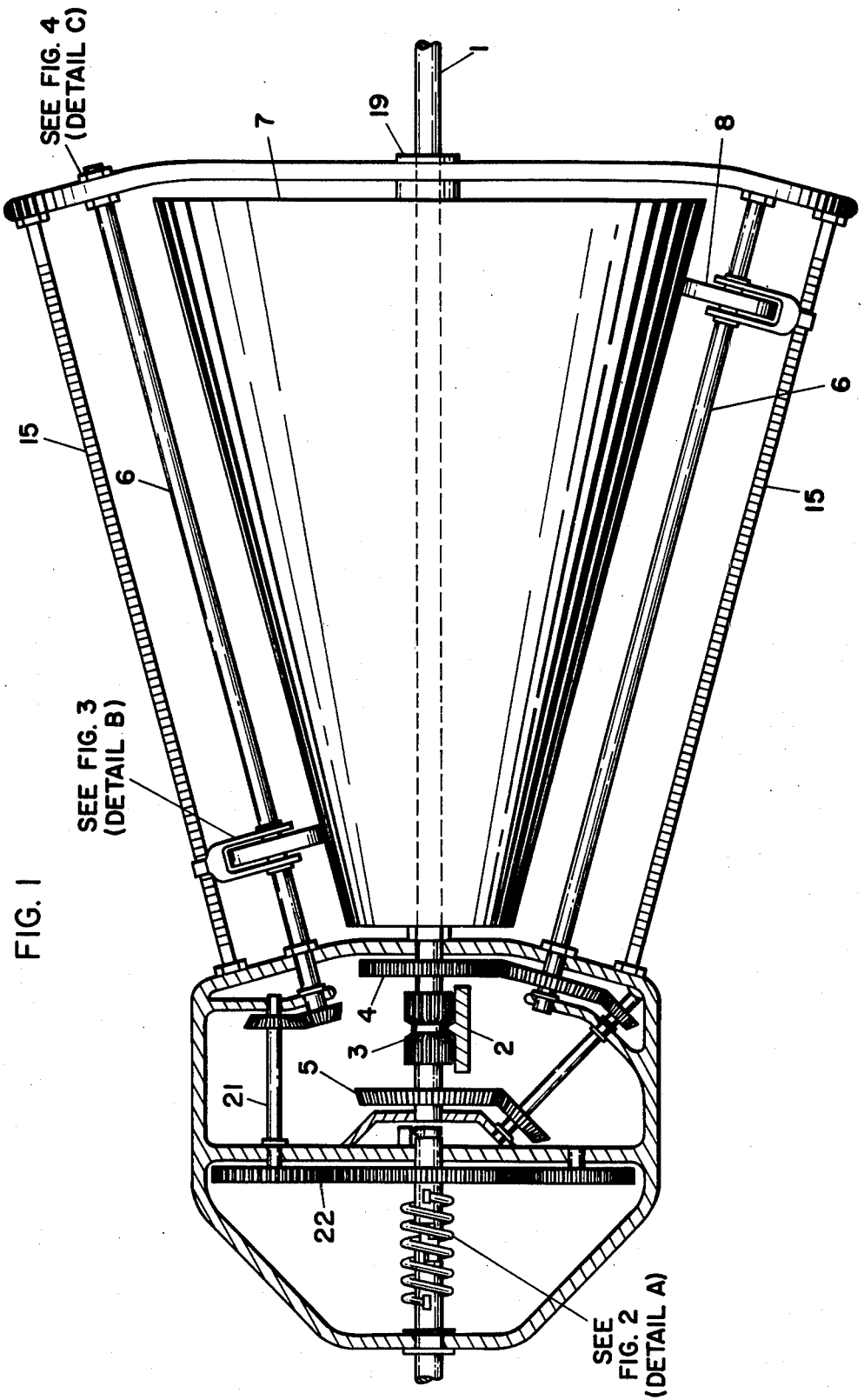

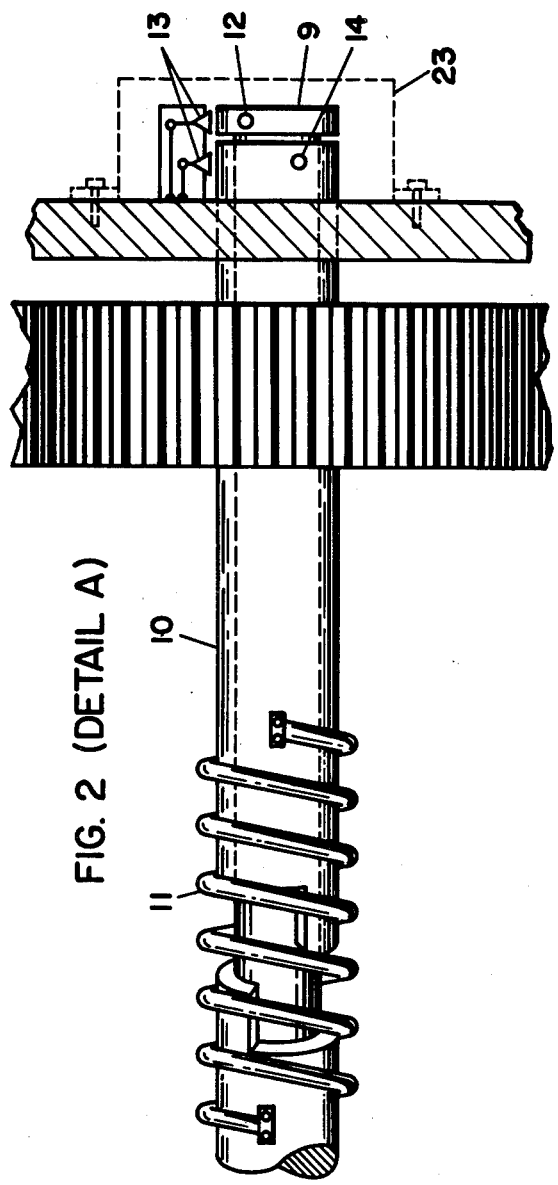
FIG. 2 (DETAIL A)
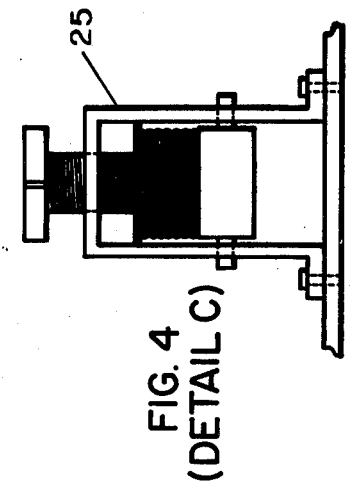
FIG. 4 (DETAIL C)
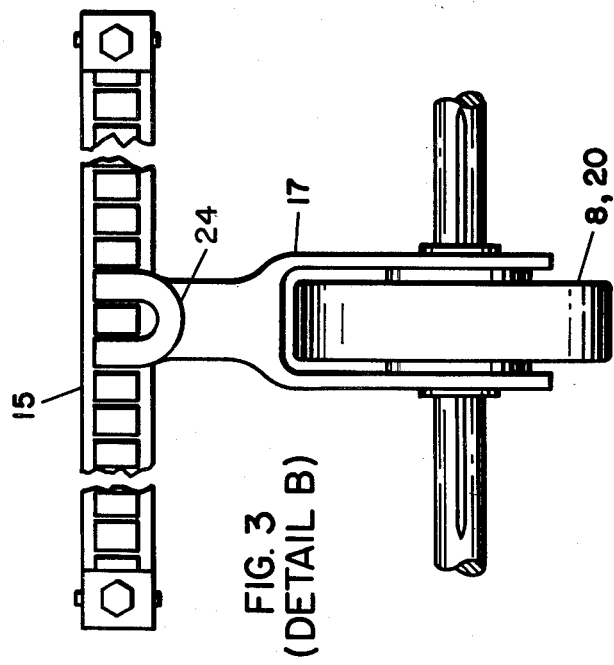
FIG. 3 (DETAIL B)

MECHANICAL POWER CONVERSION AND TRANSMISSION SYSTEMS

This application is a continuation in part of application Ser. No. 097,979 filed by Frank R. Sargent on Nov. 28, 1979.

BACKGROUND

The present state of the art, as demonstrated by current industry efforts, shows there to be some serious problems in gaining an efficient and economical use of fuel in internal combustion engines used to power motor vehicles at the present time.

Present technology requires an engine of great size/power to propel the large vehicles that Americans have grown to expect and want. Manufacturers are attempting to solve the problem by making smaller and lighter vehicles, however, this results in the loss of comfort and other amenities.

The problem lies with the drive train of the vehicle. Limitations of present transmissions do not permit a proper range of low gears to efficiently accomodate a smaller power plant, nor does it permit a cut back in power at high speeds when unneeded. General Motors has recognized the problem and attempted to solve it by introducing an 8 cylinder engine that provides for cutting out 2 or 4 cylinders at high speed, while Ford Motor Company has "re-invented" the overdrive gear. Both systems are unsatisfactory and deal with only the question of generating unnecessary power at high speeds when it is unneeded but impossible to eleminate with present technology in use. The problem of undesirable but necessary inadequate low gear ranges (with present transmissions) is not even addressed.

Transmissions now in use in automobiles offer a gear range of from approximately 4.5:1 to 1:1, and with overdrive to 1:1.2. Extention of the capabilities of present mechanisms is prohibited by cost and space limitations as well as technical problems. It appears evident that a new approach to the problem is warranted.

By the use of a cone 3" by 15" with drive wheels of 3" this invention offers a range of gears, with proper input ratios, of from 7 or 7.5:1 to 1:1.5 to 1:3. The low range will accomodate the smallest power plant that might be reasonably contemplated with more than sufficient power while the highest range is probably beyond any that might be utilized for maximum fuel economy.

FIG. 1 illustrates the transmission of the present invention.

FIG. 2 is a detailed view of the sleeve gear of the present invention.

FIG. 3 in a detailed view of the drive wheel adjustment mechanism.

FIG. 4 is detailed view of an adjustment mechanism for the control bar of the present invention.

The idea of utilizing a cone with smaller drive wheels is not new, however, the inherent problems of slippage and extreme wear on friction gear surfaces has impeded the developement of the art. Although several patents have issued on the art most of them are quite old and the use of a cone as the central part of such a device has not been substantially improved since the patent issued to HAYDEN (1923) No. (1,443,991).

This invention effectively deals with the cited problems, as revealed in the disclosure, by it's unique structural design and the addition of advanced technological developement that is made applicable by developement of the computer sciences.

Precise power ratios are maintained at all phases of operation to the degree that the mechanism is always in the best possible gear range at any speed and the problem of generating power by the prime mover in excess of amount needed for total efficiency at the higher speed ranges is totally eleminated by this system. The resulting fuel efficiency is not difficult to contemplate.

An integrated computerized cone type split-power train transmission is contemplated by this invention. Preferred mode of design and operation of such a mechanism provides for a wide range of power ratios whereby a smaller prime mover may be efficiently utilized and ultra-overdrive capabilities can be realized. Both factors contribute to far greater mileage in relation to fuel consumed in a motor vehicle. The manner by which this may be achieved is disclosed, as follows:

By reference to the illustrations, an input drive shaft(1) is splined to accomodate a sliding gear(3) that is activated by computer controlled solenoid(2) to engage input drive gear(4) or reverse gear(5) as directed by computer and in accordance with operators needs. Both input gear(4) and reverse gear(5) are mounted in flotation manner around input drive shaft(1) and are drivingly connected to geared ends of three or more jack shafts(6) located equidistant around input drive gear(4) and extending from gear box in a manner to be affixed around a cone(7) parallel to plane of cone. An input friction drive wheel(8) is mounted on a splined section of said jack shafts in a manner to traverse the plane of the cone(7) from one end to the other of the cone while in friction mesh with cone. The input drive wheels(8) rotate with the jack shafts(6) while the cone(7) is rotated by the drive wheels. The rotation of the cone(7) rotates output drive wheels (20) that are mounted on jack shafts(6) in the same manner as the input drive wheels(8) and are also in constant mesh with cone. Jack shafts(6) for output drive wheels(20) are mounted in afashion to enter gear box between jack shafts for input drive wheels and are tooth geared to extention shafts(21) to correct shafts angle and are drivingly connected to output gear(22) mounted on sleeve gear(10) that is positioned around an output drive shaft(9). Thus, the drive train of the mechanism is described.

A wide range of power ratios is available in this system that will allow for satisfactory operation with a relatively small prime mover while ultra-overdrive ratios available far exceed any available with conventional transmissions now in use, however, in order that these potentials may be fully realized it is necessary to utilize a special type of torque sensing device. The torque sensor and it's unique function is described, as follows:

The sleeve gear(10) is designed to rotate around the output drive shaft(9) for approximately ⅛ to ⅜ of a full rotation before engaging for direct drive. A helical spring(11) of known strength is mounted around the sleeve gear(10) and the output drive shaft(9) and affixed to each member in such a manner as to oppose the rotation of the sleeve gear around the shaft.

The ends of both the sleeve gear(10) and the output drive shaft(9) terminate in a sensor box(23) where magnetic "trippers" located on the sleeve gear at (14) and the drive shaft at(12) are monitored by a sensor(13) and their relative proximity to each other is relayed to the computer. The torque force exerted by the prime mover through the sleeve gear(10) to the output drive shaft (9), as resisted by the helical spring, at any speed of vehicle, can be calibrated by the computer relating the relative position of the magnetic trippers(12) and (14) to each other. The computer relates the information according to it's programmed function and, by means later to be described, moves the input drive wheels(8) and the output drive wheels(20) to varying positions along the plane of the cone(7) to achieve the most economical and efficient power ratios commensurate with the demands of the operator at any speed or mode of operation.

It is therefore possible with this system to cruise in a high speed-low power mode for the highest fuel efficiency, yet, move almost instantly to a higher power ratio for passing or other conditions that require more power. The computer simply responds to accelleration by moving the drive wheels on the cone.

Sequential operation of the system is, as follows:

Upon ignition by operator the computer activates the solenoid(2) to move the sliding gear(3) to engage input drive gear(4) (or reverse gear(5) if indicated by operator). Input drive gear (4) turns jack shafts(6) and input drive wheels(8).

(At start of operation input drive wheels(8) are situated at the large end of cone for a ratio of approximately 5:1 in relation to the cone(7), while output drive wheels(20) are situated at small end of cone for a ratio of approximately 1:1).

When power from prime mover is applied through system sensor(13) informs computer of position of tripper(14) in relation to position of tripper(12) in sensor box(23). Computer relates the information to it's programmed function and alters the position of an electrical current on control bar(15) to attract magnet (24) located in "handle" of yoke(17) mounted by bearings to the input drive wheels(8) and output drive wheels(20) splined on jack shafts(6) and (16) to move said drive wheels to optimum position along plane of cone(7).

Input drive wheels(moving in tandem) rotate the cone which is mounted around input drive shaft(1) in flotation mode. The rotation of the cone(7) rotates the output drive wheels(2) which also move in tandem and in syncronization with input drive wheels.

Output drive wheels(20) drivingly connected by extention shafts(21) to output drive gear(22) apply power to output drive shaft(9) through sleeve gear(10) as resisted by helical spring(11) to propel vehicle.

Computerized monitoring of relative torque power needed to maintain desired operating speed, with automatic adjustment of drive ratios, demonstrates advanced technology of system.

I claim:
1. A continously variable transmission comprising:
   (a) an input shaft having forward and reverse gears selectively coupled thereto by a clutch,
   (b) an output shaft coaxial with the input shaft,
   (c) an idler cone rotatably mounted on the input shaft,
   (d) a plurality of pairs of jackshafts equally spaced about the input shaft; each pair comprising a drive jackshaft and a driven jackshaft diametrically opposed relative to said input shaft;
   (i) each drive jackshaft having a first gear means for cooperating with said forward and reverse gears such that when the forward gear is coupled to the input shaft the drive jackshaft rotates in a first direction and when said reverse gear is coupled to the ,8 input shaft the drive jackshaft rotates in a second direction,
   (ii) each driven jackshaft connected to the output shaft by a second gear means,
   (iii) each jackshaft having a wheel nonrotatably and slidably mounted thereon in constant frictional contact with the idler cone, and
   (vi) actuator means for controlling in tandom the position of the wheels of each jackshaft pair along their associated jackshafts;
   (e) torque responsive control means coupled to said output shaft for sensing the power needs of the output shaft relative to the torque of the input shaft and for controlling said actuator means, whereby the position of the wheels along the jackshafts, and thus the gear ratio of the transmission is a function of the sensed torque ratio.

2. The transmission of claim 1 wherein the actuator is magnetically controlled.

3. The transmission of claim 1 wherein said control means comprises a helical spring mounted sleeve shaft about said output shaft and sensors to monitor power application.

* * * * *